(12) United States Patent
Catelli (10) Patent No.: US 8,397,769 B2
(45) Date of Patent: Mar. 19, 2013

(54) APPARATUS FOR TRANSFERRING INCOHERENT OR LIQUID MATERIAL

(75) Inventor: Luca Catelli, Lucca (IT)

(73) Assignee: ABC Pharmatech S.r.l., Lunata (LU) (IT)

( * ) Notice: Subject to any disclaimer, the term of this patent is extended or adjusted under 35 U.S.C. 154(b) by 0 days.

(21) Appl. No.: 13/262,025

(22) PCT Filed: Apr. 14, 2010

(86) PCT No.: PCT/IT2010/000162
§ 371 (c)(1),
(2), (4) Date: Nov. 8, 2011

(87) PCT Pub. No.: WO2010/119476
PCT Pub. Date: Oct. 21, 2010

(65) Prior Publication Data
US 2012/0090709 A1    Apr. 19, 2012

(30) Foreign Application Priority Data

Apr. 17, 2009   (IT) ................ FI2009A0081

(51) Int. Cl.
*B65B 1/28* (2006.01)
(52) U.S. Cl. ........ 141/114; 141/314; 141/382; 141/383; 285/55

(58) Field of Classification Search .................. 141/114, 141/313–314, 316, 363–364, 382; 137/375; 285/45, 55
See application file for complete search history.

(56) References Cited

U.S. PATENT DOCUMENTS

| | | | | |
|---|---|---|---|---|
| 5,379,810 A * | 1/1995 | Marino | ........................... | 141/10 |
| 5,582,219 A * | 12/1996 | Claar et al. | ...................... | 141/93 |
| 5,831,149 A | 11/1998 | Webb | | |
| 6,619,338 B2 * | 9/2003 | Bonde, III | ..................... | 141/114 |
| 6,988,639 B2 * | 1/2006 | Arch | .............................. | 222/105 |
| 7,168,460 B2 * | 1/2007 | Dietrich et al. | ................. | 141/10 |
| 7,487,808 B2 * | 2/2009 | Stoye et al. | .................... | 141/315 |
| RE40,840 E * | 7/2009 | Lloyd et al. | ..................... | 524/221 |
| 7,909,071 B2 * | 3/2011 | Denk et al. | ..................... | 141/114 |
| 2003/0011194 A1 | 1/2003 | Arch | | |

* cited by examiner

*Primary Examiner* — Timothy L Maust
*Assistant Examiner* — Timothy Kelly
(74) *Attorney, Agent, or Firm* — Lucas & Mercanti, LLP (57) ABSTRACT

Apparatus (1) for transferring incoherent or liquid material from a discharge station (S1) to a collection station (S2) is provided with a tubular conduit (6) located between said stations (S1, S2), and a tubular bag (9) for transferring the material from the discharge station (S1) to the collection station (S2); the tubular bag (9) develops longitudinally inside the conduit (6) between the discharge station (S1) and the collection station (S2), and is kept adherent to the conduit (6) likewise an interior coating of same conduit (6) by a pneumatic device (24, 31) which exhibits a suction region distributed along the conduit (6) between two longitudinal ends (7) of same conduit (6).

10 Claims, 7 Drawing Sheets

APPARATUS FOR TRANSFERRING INCOHERENT OR LIQUID MATERIAL

CROSS-REFERENCE TO RELATED APPLICATIONS

This application is a 371 of PCT/IT2010/000162 filed Apr. 14, 2010, which claims the benefit of Italian Patent Application No. FI2009A000081 filed Apr. 17, 2009, the contents of each of which are incorporated herein by reference.

TECHNICAL FIELD OF THE INVENTION

The present invention relates to an apparatus for transferring incoherent materials or fluids.

The apparatus according to the invention can be advantageously used in the pharmaceutical and/or chemical and/or food industry and, more in general, in all those sectors in which provision is made for transferring—from one container to another, or from a container to a hopper of a machine, or vice versa—incoherent materials such as powders, granulates, capsules, tablets or similar products or fluids.

STATE-OF-THE-ART

According to a known technique, the transfer of the above mentioned materials is performed by gravity, by providing a mouth for emptying a container or a hopper, in correspondence of an upper discharge station, and a mouth for feeding a container or a hopper, in correspondence of a lower collection station. Within the scope of the above described technique, the said emptying and feeding mouths are usually connected to each other via a conduit inside which a disposable tubular bag is inserted which acts as a protection element for the inner wall of same conduit.

The two ends of the tubular bag are connected in a substantially hermetic way to the emptying mouth and, respectively, to the feeding mouth, so that the transfer of the material will take place inside the bag without the same material being spread in the environment or inside the connection conduit. Actually, should the material in transfer be formed by chemical substances or compounds not easily degradable and/or potentially detrimental to the health, then it would be crucial to prevent the same material from contaminating the surrounding environment.

A drawback of the above described transfer-by-gravity technique stems from the possibility of formation inside the bag—always being sightly loose to avoid excessive stress and consequent breaking thereof—of undesired throats that could hinder a regular flow of material. To limit such possibility to the minimum, use is usually made of a substantially straight and vertical conduit. However, this approach brings about major layout restraints. Moreover, upon an excessively rapid flow from an upper to a lower level, it is likely that the material, especially of powder nature, will lose its homogeneity owing to a separation of its components.

A further drawback related to the rapid flow through the conduit consists of the possibility that granular products or tablets might deteriorate because of the excessive speed reached at the end of same conduit.

To overcome these drawbacks, various solutions have been proposed. For example, a proposal has been made to convey the material along the conduit pneumatically instead of by gravity. In this way it is possible to control the material's conveyance velocity and to overcome any layout restraint by providing conduits with reduced slope or exhibiting no slope at all and, when necessary, having a meandering development.

Also this solution, however, is not without drawbacks. In particular, the suction necessary to draw material toward the feeding mouth tends to suck up also the bag by causing the formation of a throat that makes it unusable. For this reason, such transfer technique generally omits the provision of a bag and, instead, the conduit is carefully washed between one discharge operation and the next. Evidently, such washing operation results demanding and expensive both in terms of time and facility requirements.

BRIEF SUMMARY OF THE INVENTION

The object of the present invention is to provide an apparatus for transferring incoherent or liquid material able to overcome the above indicated drawbacks and to allow a disconnection under perfect sealing conditions upon completion of the operating cycle.

According to the present invention, an apparatus for transferring incoherent or liquid material is provided which embodies the characteristics disclosed in any of the appended claims.

BRIEF DESCRIPTION OF THE DRAWINGS

The invention will be described below, by way of example only, with reference to the accompanying drawings, wherein.

DETAILED DESCRIPTION OF THE INVENTION

Figure 1:
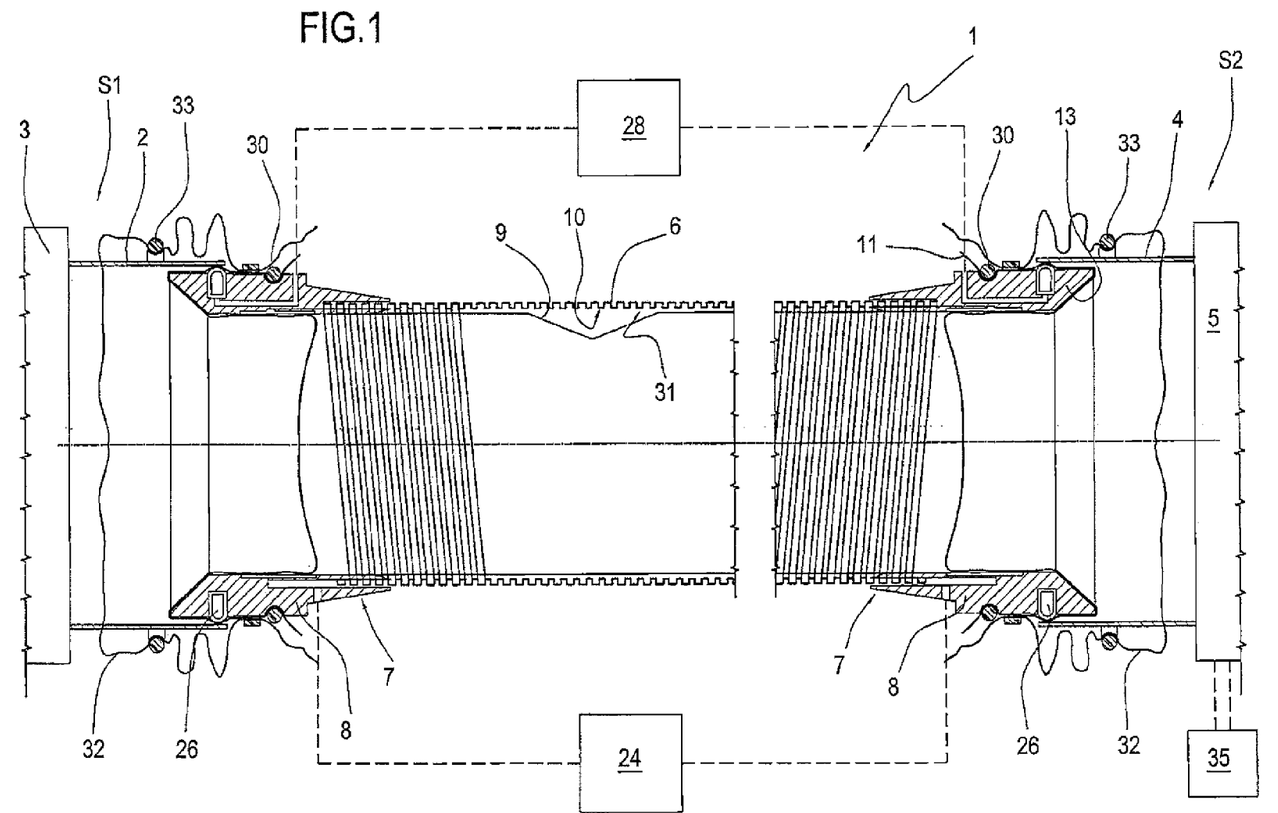
FIG. 1 is a schematic view partially in longitudinal section and with some parts taken away for the sake of clarity, of an apparatus constructed according to the present invention.

In FIG. 1, numeral 1 designates as a whole an apparatus for transferring incoherent material from a discharge station S1 to a collection station S2.

The incoherent material is, in particular, made up of powders and/or granulates and/or capsules and/or tablets, for example of the pharmaceutical or chemical or food industry.

Formed in the discharge station S1 is a mouth 2 for emptying a first container 3, while a mouth 4 for feeding a second container 5 is formed in the collection station S2.

In place of container 3, or of container 5, or of both, provision may be made for a hopper of a machine (not shown) for treating the above said material.

The apparatus 1 comprises a tubular conduit 6 interposed between the stations S1 and S2. Preferably, the conduit 6 is of rigid or semi-rigid plastic material and of substantially cylindrical shape.

Tight seal-connected to the longitudinal ends 7 of conduit 6 are respective annular terminals 8. In use, one of the two terminals 8 is tight seal-connected to the mouth 2 in the station S1, while the other terminal 8 is tight seal-connected to the mouth 4 in the station S2. Preferably, the mouths 2 and 4 are, likewise the terminals 8, of substantially cylindrical shape.

The apparatus 1 further comprises a tubular bag 9 for transferring the incoherent material from the discharge station S1 to the collection station S2.

The tubular bag 9 develops longitudinally inside the conduit 6 between the terminals 8.

The bag 9 is preferably made of thin and easily deformable plastic material of disposable type.

The bag 9 acts as a protecting element for the inner wall of conduit 6 so as to prevent the latter from being contaminated by the incoherent material in transit from station S1 to the station S2. To this end, and as described in greater detail below, one longitudinal end 11 of the bag is turned out around the respective terminal 8 and afterwards, in use, is tightly sealed between the latter and the emptying mouth 2; similarly, the other longitudinal end 11 of the bag 9 is turned out around the respective terminal 8 and, afterwards, is tightly sealed between the latter and the feeding mouth 4.

Formed along the inner wall 10 of conduit 6, longitudinally to the axis of the latter, is a slot 31 having spiral development and being possibly formed either directly out of the wall's profile, or constructed with an external insert element made of metal or plastic material, said slot starting from the above said one end 7 and ending up in the above said other end 7.

Figure 4:
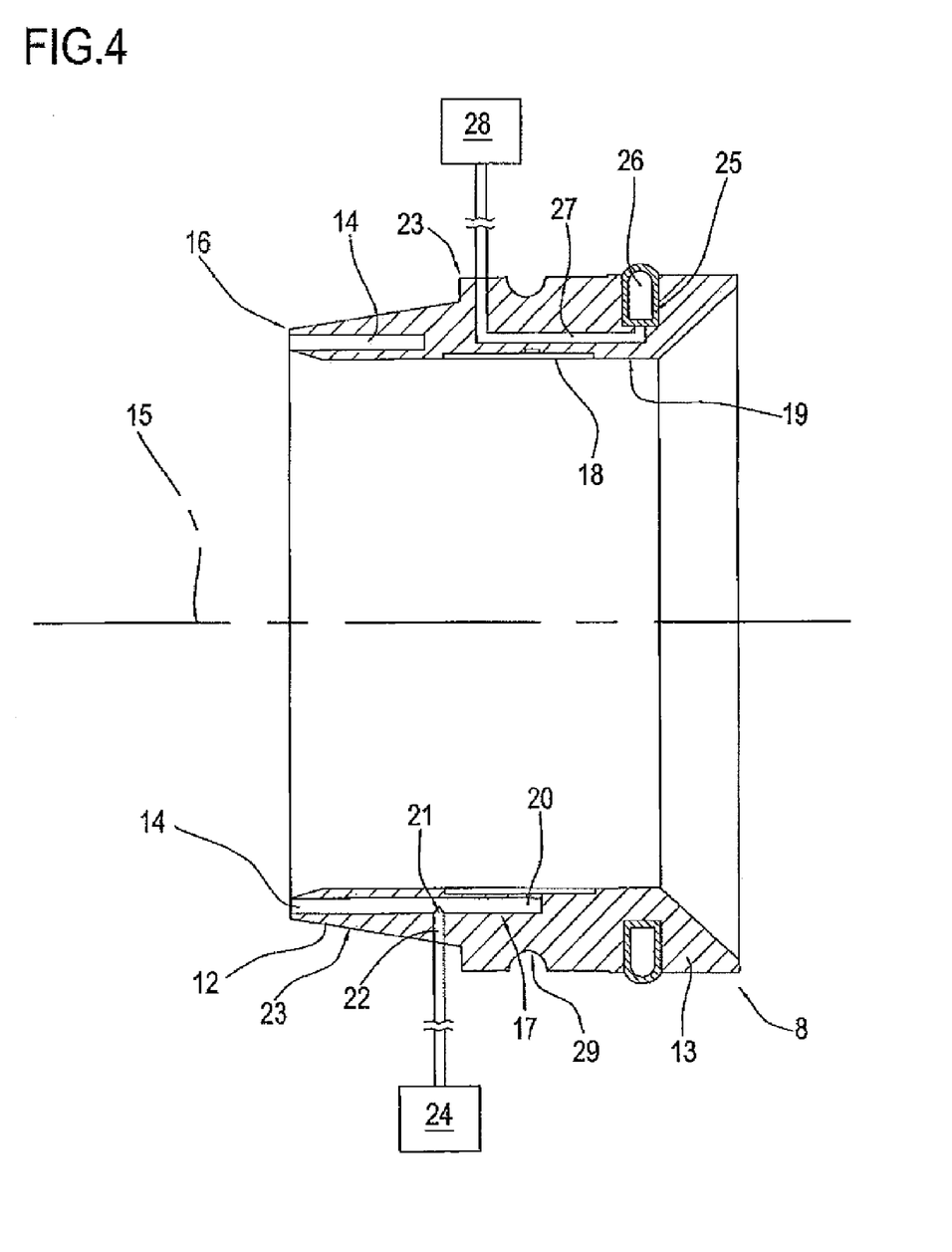

According to what is best represented in FIG. 4, each terminal 8 is longitudinally delimited by one end 12, in corresponding of which the terminal 8 is coaxially connected to the conduit 6, and by an opposite end 13 astride of which the bag 9 is turned out as above mentioned.

The end 12 exhibits an annular chamber 14 that develops symmetrically about the central axis 15 of terminal 8.

The chamber 14 is open in correspondence of the annular end edge 16 of terminal 8, so as to allow the introduction of the end 7 of conduit 6 into the same chamber 14.

On the side longitudinally opposite to edge 16, the chamber communicates with a pneumatic circuit 17 also formed, likewise chamber 14, in the body of terminal 8. In greater detail, the circuit 17 further communicates with a suction mouth 18 which is defined by an annular recess of the peripheral inner wall 19 of terminal 8. The mouth 18 develops symmetrically about the axis 15 and is put into communication with the chamber 14 via a first conduit 20 of circuit 17, parallel to the axis 15. The conduit 20 is connected to the chamber 14 by means of a suction node 21 from which a second conduit 22 of circuit 17 branches off going through the end 12 in a direction orthogonal to the axis 15 and leading to the outer peripheral wall 23 of terminal 8. Outside the terminal 8, the conduit 22 ends up to a pneumatic suction source which, being of known type, is represented only diagrammatically by the block 24. The source 24 is connected to both the terminals 8.

The end 13 is formed with an annular groove 25 inside which an inflatable gasket 26 is fitted.

The groove 25 develops symmetrically about the axis 15 and is put into communication with a conduit 27 which is formed in the body of terminal 8 and leads to the outer peripheral wall 23 of terminal 8.

Outside the terminal 8, the conduit 27 ends up to a compressor which, being of known type, is represented only diagrammatically by the block 28.

The compressor 28 is connected to both the terminals 8. In a substantially central position between the ends 12 and 13, the outer peripheral wall 23 of terminal 8 is formed with an annular groove 29 having semicircular cross-section.

Figure 3:
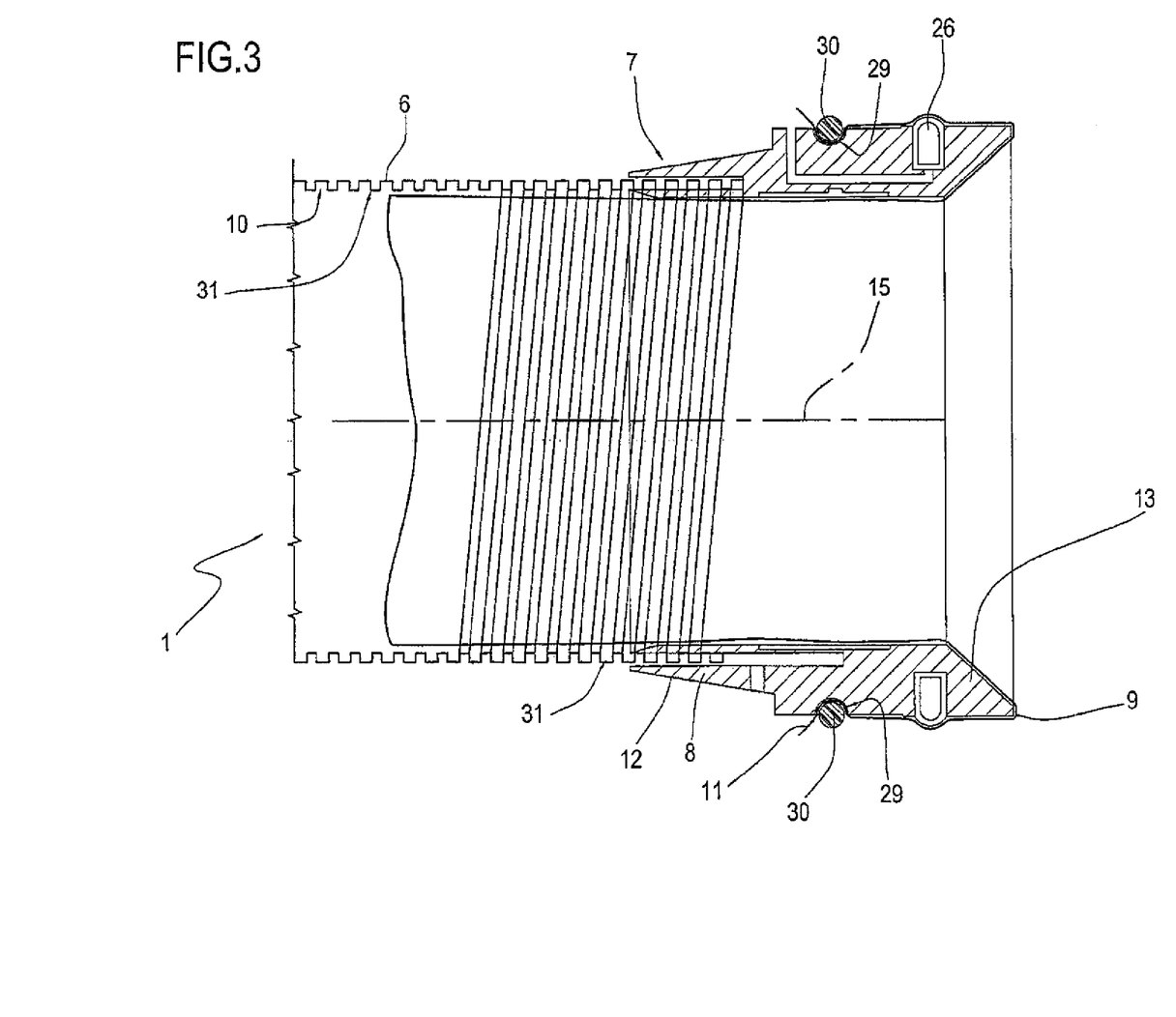

As best shown in FIG. 3, the groove 29 develops symmetrically about the axis 15 and defines a seat wherein an O-ring 30 seals tightly the end 11 of bag 9 onto the terminal 8.

In use, the slots 31 is put under vacuum state starting from chambers 14. The portion of slot 31 extending out of chambers 14, that is, between the two terminals 8, actually defines a suction means—distributed along the conduit 6 between the ends 7 and interposed between the conduit 6 and bag 9—which draws back the bag 9 toward the inner wall 10 of conduit 6. The bag 9, by adhering progressively to the wall 10 starting from terminals 8, closes progressively the slot 31 from the ends of conduit 6 to the centre thereof, thereby causing the vacuum to propagate along a spiral and/or longitudinal chamber 46 formed by the outer wall 47 of bag 9 and same slot 31.

Accordingly, owing to the vacuum generated by the source 24, the bag 9 adheres to the conduit 6 likewise an internal coating of same conduit 6. In other words, the bag 9 acts as a protective lining, or sheath for the conduit 6.

It will be appreciated that the source 24 can, alternatively, be connected to only one of terminals 8, for example if the conduit 6 is relatively short.

In the latter case, in the terminal 8 not connected to the source 24, the conduit 22 is closed by a plug (non shown).

It should also be noted that, owing to the mouth 18, the bag 9, in each terminal 8, adheres to the inner peripheral wall 19 thereof. Therefore, the bag 9 is kept adherent to the conduit 6 and to the terminals 8 as well; this prevents the bag 9 from collapsing undesirably.

Upon transferring the material from the station S1 to the station S2—once the bag 9 previously retained on the terminals 8 by the O-rings 30 is brought to adhere to the conduit 6 and terminals 8 as above described—provision is made for fitting the terminals 8 to the mouths 2 and 4 and for subsequently inflating the gaskets 26.

Figure 2:
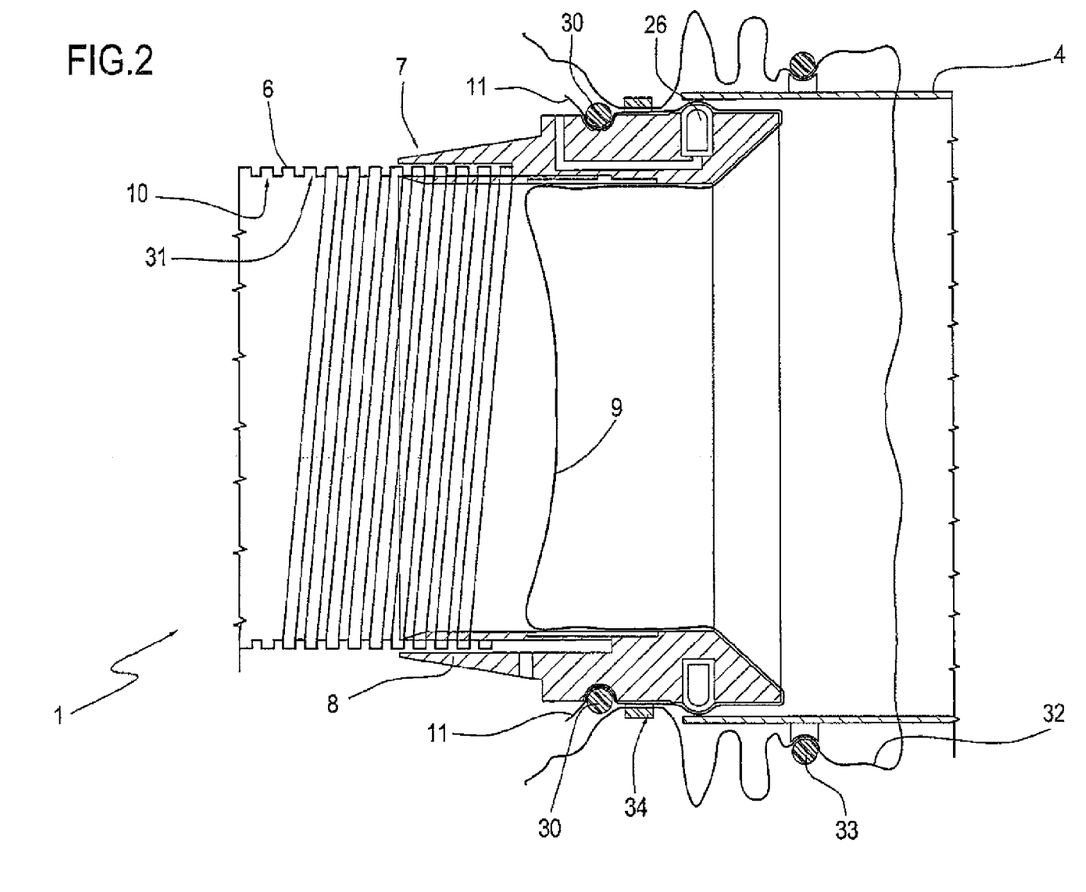
FIGS. 2, 3 and 4 show, respectively, one detail of the apparatus of FIG. 1.

Prior to be fitted to terminals 8, the mouths 2 and 4 are enclosed by the respective tubular bags 32 which are blocked on the mouths 2 and 4 by means of respective O-rings 33. As shown in FIG. 2, each of the two bags 32 reaches out well over the respective mouth 2, 4 likewise a stocking, so as to encircle the respective terminal 8 in a contracted configuration and allow to be welded to the bag 9 at a point 34 between the O-ring 30 and gasket 26.

Once the welding or mechanical sealing is completed at points 34, provision is made for transferring the material from station S1 to station S2. At the end of transfer, the gaskets 26 are deflated and the mouths 2 and 4 axially moved away from terminals 8 thereby stretching the bags 32 previously contracted between the O-rings 33 and the points of welding or mechanical sealing 34.

Figure 5:
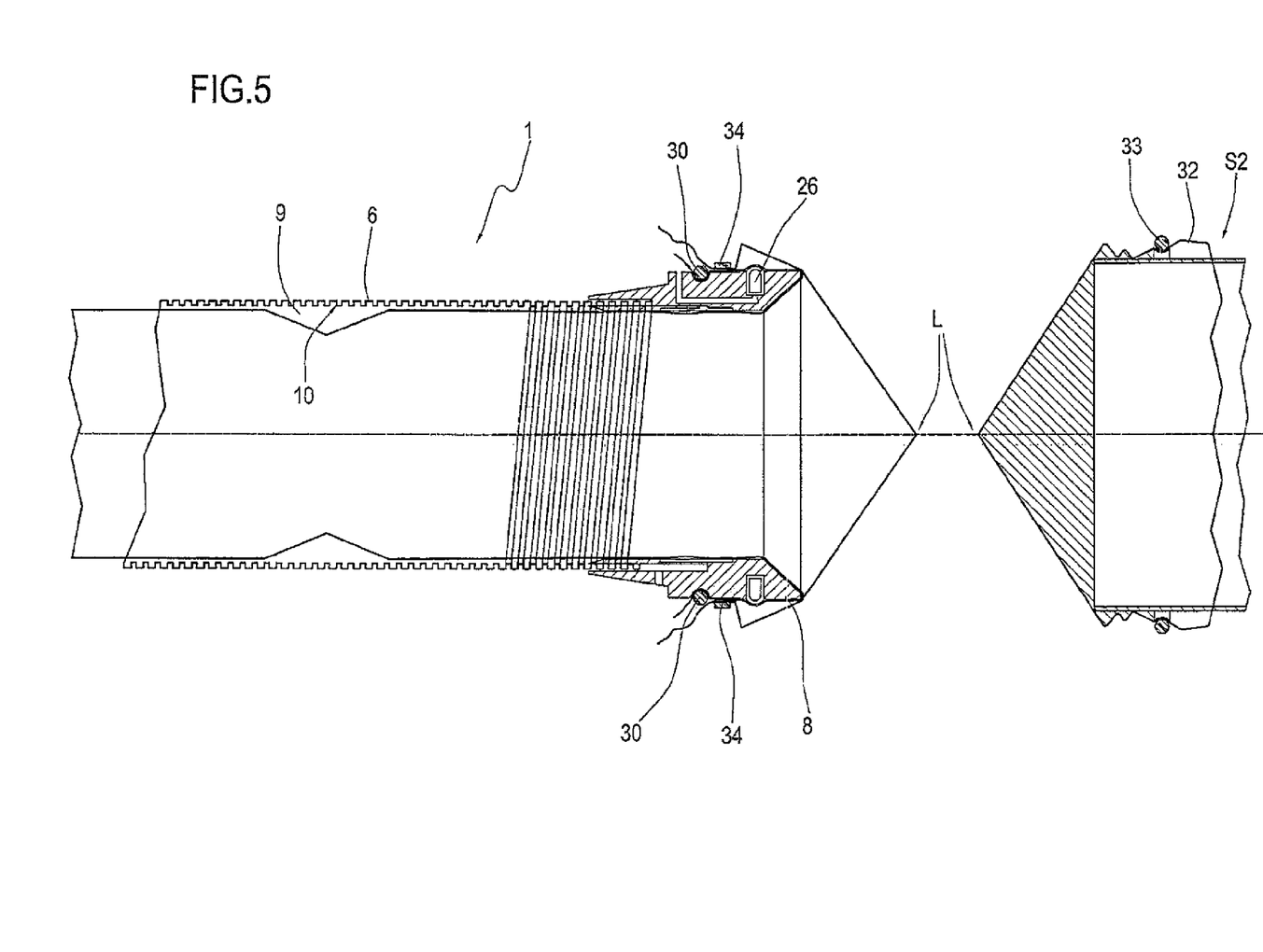
FIGS. 5 and 6 show the apparatus of FIG. 1 under successive operating steps.

Afterwards, as illustrated in FIG. 5, the bags 32 are closed by welding or mechanically, and then cut along the welding line L, each one between the respective mouth 2, 4 and respective terminal 8. The mouths remain thus sealed and the bag 9 closed at both ends.

Figure 6:
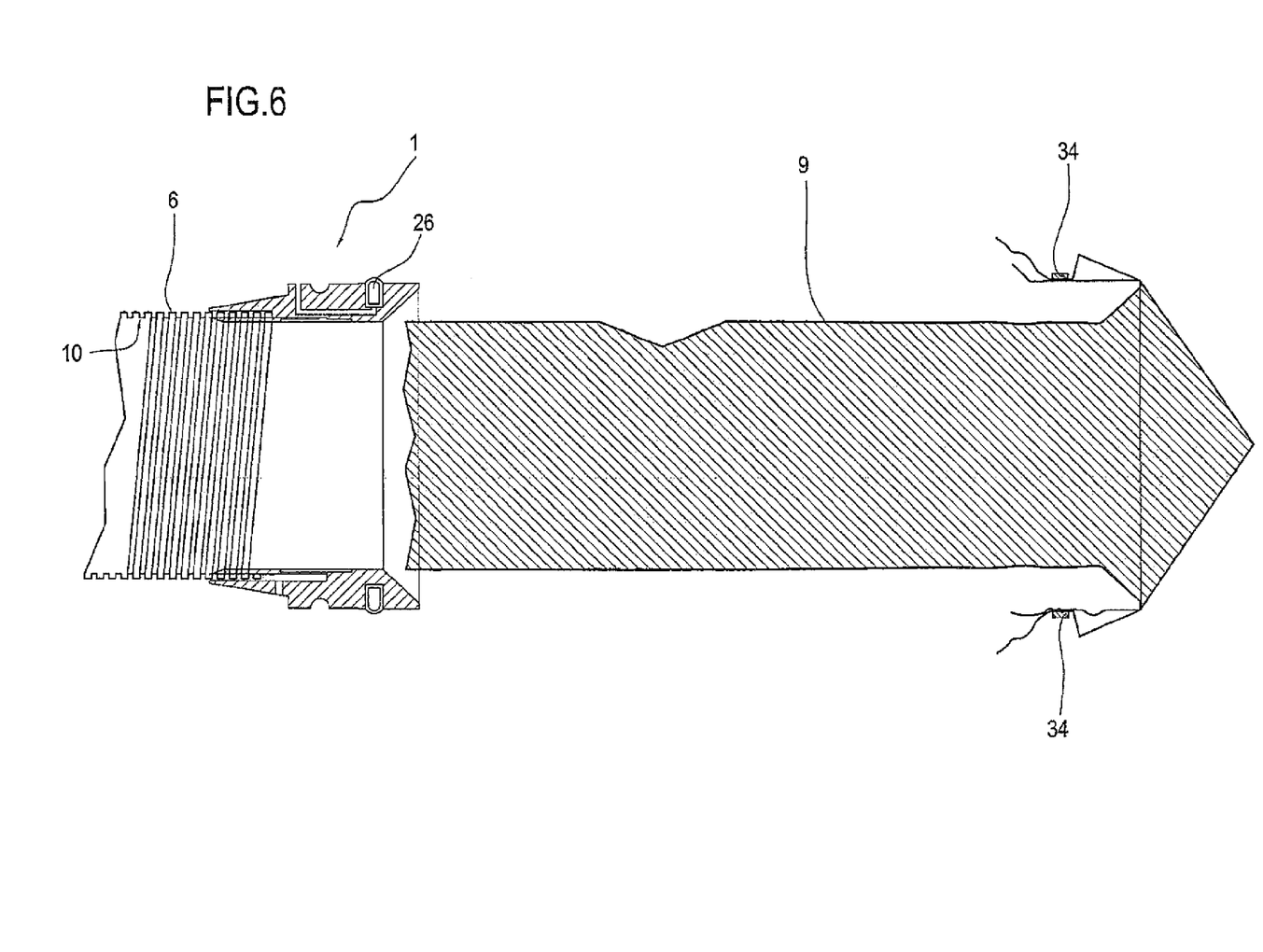

The subsequent removal of the O-rings and the suppression of vacuum created by the source 24 make it possible to withdraw the bag 9 from the conduit 6, as shown in FIG. 6, without the bag 9 holding residual material that could contaminate the surrounding environment.

The transfer of material from station S1 to station S2 may take place pneumatically or by gravity.

In the first case, a suction source 35 is associated with the inner cavity of the tubular bag 9 and, in particular, it is connected to the container 5, while the stations S1 and S2 may be disposed at the same level or at different levels. In other words, the apparatus 1 shown in FIG. 1 can be variously oriented in the space, according to layout requirements and depending on the facility in which the same apparatus 1 is housed.

Obviously, the suction source 24 must be so dimensioned as to provide a vacuum action that will not tend to detach the bag 9 from the wall 10 of conduit 6 by sucking it up toward the centre of same conduit 6.

As the bag 9 adheres substantially like a sheath to the conduit 6, the same conduit 6 may also develop along a meandering, as well as a straight path.

In the second case, wherein the transfer of the material takes place by gravity, the discharge station S1 is disposed at an upper level and the collection station S2 is disposed at a lower level.

Also in this case, since the bag 9 adheres substantially like a sheath to the conduit 6, the same conduit 6 may develop along a slightly meandering as well as a straight path, and may be disposed with a moderate incline and, thus, not necessarily vertical, without this causing the bag 9 to collapse or, in general, to take up incorrect attitudes inside the conduit 6.

Figure 7:
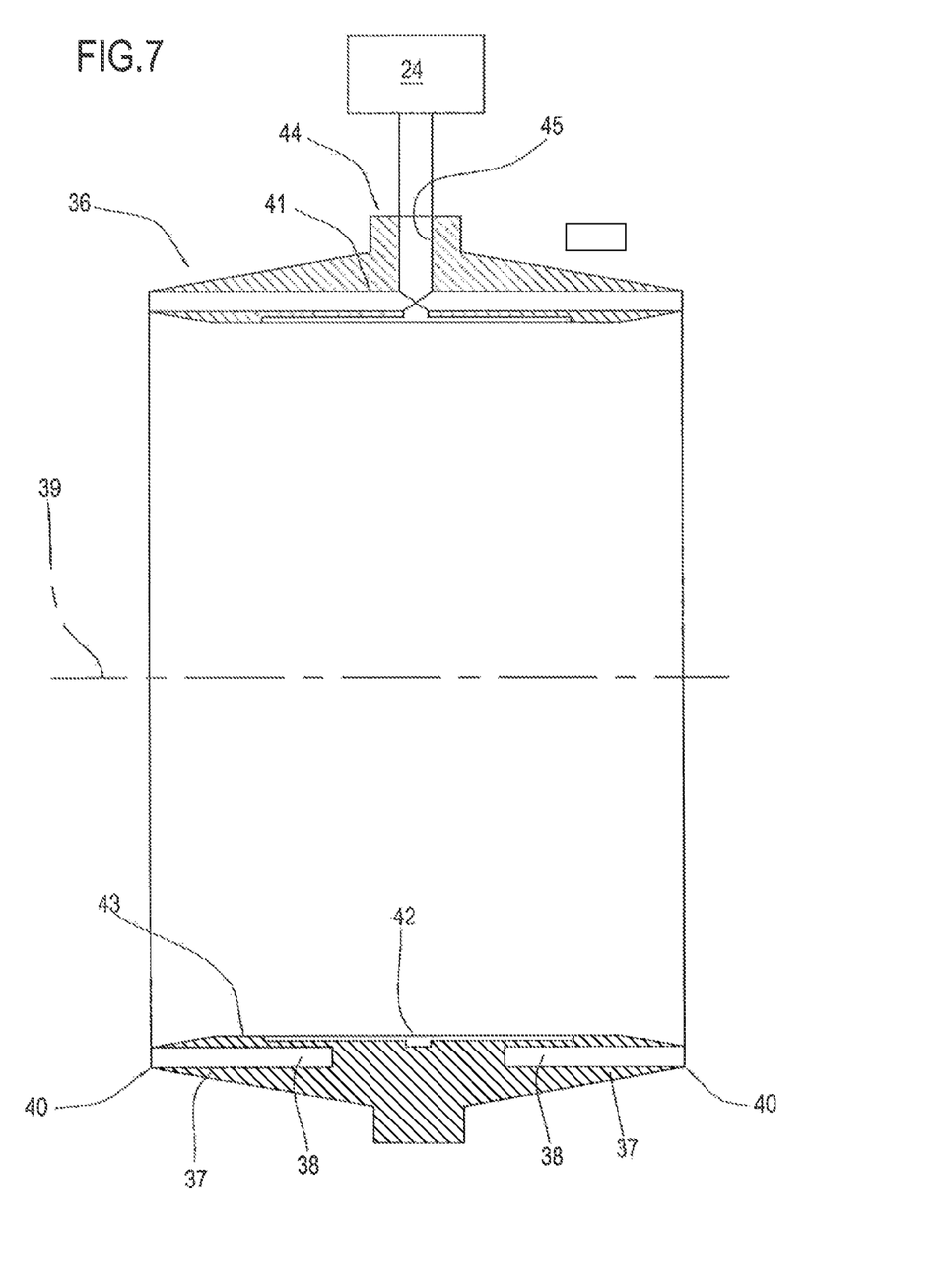
FIG. 7 is a longitudinal view partially sectioned of an optional component of the apparatus of FIG. 1.

In case of very long conduits 6, it can be necessary to provide an intermediate suction block 36 such as the one illustrated in FIG. 7.

The block 36 has an annular, substantially cylindrical shape and is longitudinally delimited by two ends 37 in correspondence of which it is coaxially connected to two sections of conduit 6.

Each end 37 exhibits an annular chamber 38 which develops symmetrically about the central axis 39 of block 36.

Each chamber 38 is open in correspondence of the relevant annular end edge 40 of block 36 so as to allow the introduction of the section of conduit 6 within the same chamber 38.

On the side longitudinally opposite to edges 40, the two chambers 38 communicate to each other by means of a pneumatic circuit 41 formed, likewise the chambers 38, in the body of block 36. In greater detail, the circuit 41 communicates also with a suction mouth 42 which is defined by an annular recess of the peripheral inner wall 43 of block 36. The mouth 42 develops symmetrically about the axis 39.

The circuit 41 leads to the peripheral outer wall 44 of block 36 with a conduit 45 orthogonal to the axis 39.

Outside the block 36, the conduit 45 leads to the source 24.

In use, the slot 31 is put under vacuum state starting from chambers 14 and chambers 38. In this case, the bag 9 adheres progressively to the wall 10 of conduit 6 starting from the terminals 8 and block 36, by progressively closing the slot 31 in a way similar to that above described.

The thus conceived invention is evidently apt for industrial application; it may also be subject to numerous modifications and variants all falling within the scope of the inventive idea; moreover all the parts may be replaced by technically equivalent elements.

The invention claimed is:

1. An apparatus for transferring incoherent or liquid material from a discharge station to a collection station, comprising:

a tubular conduit located between said discharge station and said collection station;

a tubular bag for transferring the material from the discharge station to the collection station; said tubular bag developing longitudinally inside the conduit between the discharge station and the collection station;

two annular terminals, each annular terminal tight seal-connected to one of two longitudinal ends of said conduit and a first pneumatic suction means acting between said conduit and said bag to keep the bag adherent to the conduit and to protectively line the inside of said conduit;

wherein a longitudinal end of the bag is turned out around the respective terminal and is sealingly retained between the respective annular terminal and a feeding mouth associated with said collection station.

2. The apparatus according to claim 1, wherein in said first pneumatic suction means exhibit a suction region distributed along the conduit between two longitudinal ends of same conduit.

3. The apparatus according to claim 1, wherein said first pneumatic suction means comprise a vacuum chamber formed at least in part in the inner wall of the conduit.

4. The apparatus according to claim 1, wherein said first pneumatic suction means comprise a vacuum chamber defined between the inner wall of the conduit and the outer wall of the bag.

5. The apparatus according to claim 4, wherein said chamber develops along a spiral and/or longitudinal path between the two longitudinal ends of the conduit.

6. The apparatus according to claim 5, wherein the inner wall of the conduit exhibits a spiral and/or longitudinal slot defining a bottom wall of said chamber.

7. The apparatus according to claim 1, wherein said conduit extends along a meandering path.

8. The apparatus according to claim 1, wherein said conduit extends along a straight path.

9. The apparatus according to claim 1, wherein said discharge station is disposed at a first level and said collection station is disposed at a second level below the first level; the transfer of the incoherent material taking place by gravity.

10. The apparatus according to claim 1, further comprising a second pneumatic suction means associated with the inner cavity of the tubular bag to suck the incoherent material towards said collection station.

* * * * *